3,808,219
2-(TRIHALOAMINOPYRIDYL)THIAZOLINES
Stanley J. Strycker and Don V. Wysong, Midland, Mich., assignors to The Dow Chemical Company, Midland, Mich.
No Drawing. Filed Oct. 25, 1972, Ser. No. 300,801
Int. Cl. C07d 31/50
U.S. Cl. 260—294.8 D   3 Claims

ABSTRACT OF THE DISCLOSURE 2-(aminotrihalopyridyl) - 2 - thiazoline compounds and their acid addition salts, such as 2-(4-amino-3,5,6-trichloro-2-pyridyl) - 2 - thiazoline and 2-(4-amino-3,5,6-tribromo-2-pyridyl)-2-thiazoline hydrobromide are prepared by the reaction of a 4-amino-3,5,6-trihalopicolinonitrile with 2-aminoethanethiol. The novel compounds have plant growth regulator activity and are useful as herbicides.

SUMMARY OF THE INVENTION

This invention relates to 2-(4-amino-3,5,6-trihalo-2-pyridyl)-2-thiazoline compounds corresponding to the formula

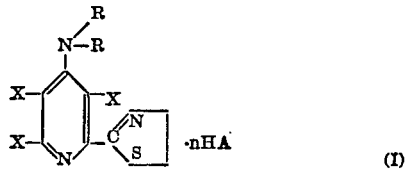

wherein X represents chloro, bromo or fluoro, R represents hydrogen, methyl or ethyl, $n$ represents one of the integers zero and one, and A represents the non-toxic anionic moiety of an acid addition salt. The term "non-toxic anionic moiety" as herein employed refers to an anionic moiety in salts of a thiazoline compound of the above formula which anion is substantially non-toxic and innocuous when such a salt is employed as a herbicide in the vicinity of animals or desirable plants at application rates consistent with good herbicidal activity against plant species to be controlled. Suitable non-toxic anions include those of acid-addition salts with inorganic acids such as hydrochloric, hydrobromic, sulfuric, nitric or phosphoric acid, or with organic acids such as acetic, propionic, toluenesulfonic or methanesulfonic acid, for example.

The thiazoline compounds of the invention are crystalline solids or viscous oils which are of varying degrees of solubility in aqueous acids and in organic liquids such as ether, alcohols, tetrahydrofuran, chlorinated hydrocarbons, lower alkanes and esters such as ethyl acetate and which are slightly soluble in water.

The thiazoline compounds of the invention have useful plant growth regulatory activity and can be used as herbicides for controlling growth of undesirable plants such as pigweed, ragweed, and bindweed. Preferred compounds for such use are those corresponding to the formula above wherein R represents hydrogen.

The novel compounds can be prepared by the reaction of 4-substituted amino 3,5,6-trihalopicolinonitrile (also named as 4-substituted amino 3,5,6-trihalo-2-cyano-pyridine) with a 2-aminoethanethiol hydrohalide.

The reaction of the 4-substituted amino-3,5,6-trihalopicolinonitrile with the 2-aminoethanethiol hydrohalide proceeds when the reactants are contacted and mixed, typically in the presence of an inert organic liquid as a reaction medium, and in the presence of a hydrogen halide acceptor. Representative inert organic liquids which can be employed as reaction media include benzene, toluene, and 1,2-dichlorobenzene. Representative hydrogen halide acceptors which can be employed include sodium acetate, sodium carbonate, trimethylamine, triethylamine, pyridine, lutidine and the like. The reaction proceeds at temperatures of from about 80 to about 200° C. and is preferably carried out at the boiling temperature of the reaction mixture under reflux. The exact proportions of the reactants to be employed is not critical; however, the reaction consumes the reactants in equimolar proportions and the reactants are preferably employed in substantially such proportions. An excess of the hydrogen halide acceptor is preferably employed. The reaction is generally complete in about 1 to about 4 hours depending upon the reactants and reaction temperature employed. Salt by-products formed by the reaction of the hydrogen halide of reaction with the hydrogen halide acceptor can be separated from the reaction mixture or from the product by filtration and washing, extraction or the like. The reaction also produces ammonia of reaction, which can be carried out in a nitrogen stream, and monitored to follow the progress of the reaction. The product can be separated by conventional procedures such as by evaporation under reduced pressure to remove the reaction medium or treatment with water and separation of the resulting separated free base product. The separated material can be purified by recrystallization, extraction, washing, or other conventional procedures. Preferably, the product is converted to a non-toxic acid addition salt and purified in the form of the salt.

The non-toxic acid addition salts of the thiazoline compounds are conveniently prepared by dissolving the free base compound in a solvent such as methanol, ethanol or isopropanol and thereafter adding an excess of a suitable acid such as hydrochloric, hydrobromic, sulfuric, malic, maleic or citric acid or the like until precipitation of the salt product is complete. The reaction is conveniently carried out at room temperature. The product can be separated by conventional procedures such as evaporation, filtration or centrifugation and purified by conventional procedures such as recrystallization.

The free base thiazoline compounds can be prepared from the salts by mixing the salt or a solution of the salt in a minimal amount of methanol with an excess of an aqueous base such as sodium hydroxide, potassium hydroxide or sodium carbonate. The free base thiazoline compound can be separated by conventional procedures such as extraction with an organic solvent such as benzene, ether, or a chlorinated hydrocarbon solvent. The free base can be purified by conventional procedures such as recrystallization or it can be converted to a non-toxic acid addition salt.

DESCRIPTION OF THE PREFERRED EMBODIMENT

The following example is illustrate of the invention but is not intended to limit the same.

Example 4-amino - 3,5,6 - trichloropicolinonitrile (22.25 grams; 0.1 mole); 2-aminoethanethiol hydrochloride (15.1 grams; 0.133 mole) and 13 milliliters of triethylamine (.0945 mole) are mixed together in 70 milliliters of 1,2-dichlorobenzene. Nitrogen gas is directed over the mixture while the mixture is heated for a period of about 2 hours. The ammonia of the reaction is collected by passing the exit gases through a gas trap, and the progress of the reaction is followed by neutralizing the trapped ammonia with aqueous hydrochloric acid. During the course of the reaction the mixture is heated to a temperature of about 125° C. over a 45 minute period then to about 153° C. over the next 20 minutes. Heating and stirring are continued at a temperature of 153° C. for an additional 45 minutes, at which time the reaction mixture is allowed to cool at room temperature. The mixture is diluted with an approximately equal volume of water, and the resulting organic layer is separated. The organic layer, containing the 2-(4-amino-3,5,6-trichloro-2-pyridyl)-2-thiazoline free base product, is dissolved in isopropanol. An isopropanol solution of hydrochloric acid is added until precipitation is complete. The resulting mixture is cooled (about 5° C.) and filtered. The 2-(4-amino-3,5,6-trichloro-2-pyridyl)-2-thiazoline hydrochloride product is obtained as a light tan crystalline solid melting at a temperature of 251–253° C.

In substantially the same procedure described above and employing similar inert organic solvents and hydrogen halide acceptors, but substituting an appropriate substituted amino trihalopicolinonitrile, the following thiazoline compounds of the invention are prepared:

2-(4-dimethylamino-3,5,6-trichloro-2-pyridyl)-2-thiazoline, having a molecular weight of 310.5 is prepared by substituting 4-dimethylamino-3,5,6-trichloro-picolinonitrile in the above procedure.

2-(4-amino-3,5,6-tribromo-2-pyridyl)-2-thiazoline hydrobromide having a molecular weight of 485, is prepared by substituting 4-amino-3,5,6-tribromo-picolinonitrile in the above procedure, and using hydrogen hydrobromide isopropanol to prepare the salt.

2-(4-dimethylamino-3,5,6-trifluoro-2-pyridyl)-2-thiazoline nitrate, having a molecular weight of 340 is prepared by substituting 4-dimethylamino-3,5,6-trifluoro-picolinonitrile in the above-described procedure and treating the free base with nitric acid.

2-(4-diethylamino-3,5,6-trichloro-2-pyridyl)-2-thiazoline hydrochloride, having a molecular weight of 375, is prepared by substituting 4-diethylamino-3,5,6-trichloro-picolinonitrile in the above procedure.

The compounds of the invention are useful as herbicides for the control of undesirable vegetation, at such uses they can be formulated with conventional adjuvants and applied to plants and their habitats in accordance with known procedures. The thiazoline compounds are particularly useful in pre-emergent applications to soil containing weed seeds. In representative operations substantially complete control of the termination and growth of ragweed and bindweed is obtained when 2-(4-amino-3,5,6-trichloro-2-pyridyl)-2-thiazoline hydrochloride is applied to soil planted with viable seeds of the above-named weed species, the application being carried out as a drench at rates of 5 or 10 pounds of thiazoline compound per acre. Corn planted in soil treated with the same thiazoline compound at equivalent rates, is observed to germinate and grow normally.

What is claimed is:

1. A member of the group consisting of compounds corresponding to the formula

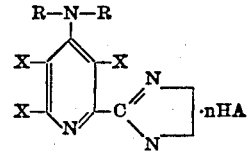

wherein X in each occurrence thereof represents halo of atomic number 9 to 35 inclusive, R in each occurrence represents hydrogen or lower alkyl of 1 to 2 carbon atoms, inclusive; $n$ represents one of the integers zero and one and HA represents the acid moiety of a non-toxic acid addition salt.

2. A compound of claim 1 wherein each X represents chloro and each R represents hydrogen.

3. A compound of claim 2 wherein HA represents hydrochloride and $n$ is one.

References Cited
UNITED STATES PATENTS 3,258,464   6/1966   Sasse et al. _____ 260—294.8 D
3,669,976   6/1972   Gubler et al. ____ 260—294.8 D ALAN L. ROTMAN, Primary Examiner U.S. Cl. X.R.

71—90

PO-1050
(5/69)

UNITED STATES PATENT OFFICE
CERTIFICATE OF CORRECTION

Patent No. 3,808,219      Dated April 30, 1974

Inventor(s) S. J. Strycker and D. V. Wysong

It is certified that error appears in the above-identified patent and that said Letters Patent are hereby corrected as shown below:

Column 2, line 53, "illustrate" should be -- illustrative --;

Column 4, line 15, the formula should appear as follows:

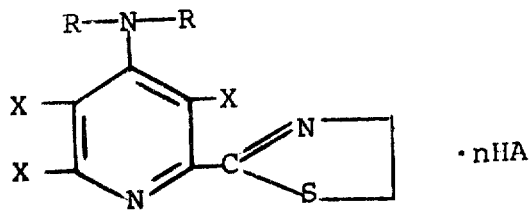

·nHA

Signed and sealed this 5th day of November 1974.

(SEAL)
Attest:

McCOY M. GIBSON JR.
Attesting Officer

C. MARSHALL DANN
Commissioner of Patents